United States Patent Office 3,387,025
Patented June 4, 1968

3,387,025
ARYLPHOSPHINODITHIOIC ACIDS
John P. Chupp, Kirkwood, Mo., and Peter E. Newallis, Morris Plains, N.J., assignors to Monsanto Company, a corporation of Delaware
No Drawing. Filed Sept. 28, 1962, Ser. No. 227,064
8 Claims. (Cl. 260—502.4)

This invention relates to a new and useful method of making arylphosphinodithioic acids of the formula

wherein R is a hydrocarbyl radical free of aliphatic unsaturation and wherein R' is an aromatic radical having a resonant carbocyclic aromatic ring structure directly attached to the phosphorus atom, said R' also being free of aliphatic unsaturation.

In accordance with this invention it has been found that the above described arylphosphinodithioic acids can be obtained in an efficient and convenient manner by reacting in the presence of an aluminum halide catalyst a hydrocarbylthionophosphine sulfide having a ratio of substituents of phosphorus to sulfur to hydrocarbyl radical R of approximately 1:2:1, the said hydrocarbyl radical R having the above described significance, with an aromatic compound of the formula R'H wherein R' has the above described significance.

The hydrocarbylthionophosiphine sulfide reactants of the method of this invention are in general high melting solids. They are characterized by a ratio of substituents of phosphorus to sulfur to hydrocarbyl radical R of approximately 1:2:1 and are usually represented by the broad formula $(R-PS_2)_n$ or, and preferably, by the formula

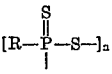

wherein $n$ is a whole number, usually less than 5, and wherein R has the aforedescribed significance, namely a hydrocarbyl radical free of aliphatic unsaturation (i.e. free of olefinic and/or acetylenic unsaturation), as for example the various alkyl, aryl, alkaryl, aralkyl, cycloalkyl, etc. containing 1 to 18 carbon atoms, exemplary of which are methyl, ethyl, propyl, butyl, amyl, hexyl, heptyl, octyl, decyl, dodecyl, tetradecyl, octadecyl, cyclopentyl, cyclohexyl, cycloheptyl, methylcyclohexyl, cyclohexylmethyl, bicyclohexylyl, phenyl, tolyl, xylyl, cumyl, dodecylphenyl, cyclohexylphenyl, benzyl, phenethyl, phenepropyl, bibenzylyl, benzylphenyl, biphenylyl, terphenylyl, naphthyl methylnaphthyl, naphthylmethyl, anthracyl, phenathryl, indanyl, indenyl, fluorenyl, etc., and the various isomeric forms thereof containing up to 18 carbon atoms. In general it is preferred that the "hydrocarbyl radical" be phenyl, $C_6H_5$, or an alkyl radical containing 1 to 4 carbon atoms having at least one hydrogen substituent on the alpha-carbon atom (i.e. the primary and secondary alkyl radicals as exemplified by methyl, ethyl, n-propyl, n-butyl, isopropyl, isobutyl, and sec. butyl).

These hydrocarbylthionophosphine sulfide reactants of the method of this invention are prepared by reacting hydrogen sulfide with a hydrocarbylthionophosphonic dichloride of the formula

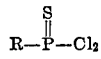

wherein R has the aforedescribed significance. This reaction is accompanied by the evolution of hydrogen chloride and therefore the overall chemical equation can be set forth as

wherein $n$ is a whole number, usually less than 5, and wherein R has aforedescribed significance. The hydrocarbylthionophosphine sulfide product so produced is in many instances a mixture, the component parts of which are characterized by a ratio of substituents of phosphorus to sulfur to hydrocarbyl radical R of approximately 1:2:1 and which satisfy the formula

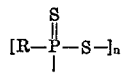

wherein R has the aforedescribed significance and wherein $n$ is a whole number, usually less than 5. Molecular weight determinations via standard ebullioscopic methods in carbon tetrachloride indicate the hydrocarbylthionophosphine sulfide product is or is predominantly the dimeric form (i.e., $n=2$), the other forms when present usually being the trimeric (i.e., $n=3$) or the tetrameric (i.e., $n=4$) or higher polymeric forms. Each member of the mixture as well as the total mixture or any combination thereof function the same with respect to the aromatic reactant R'H of the method of this invention.

As illustrative of the hydrocarbylthionophosphine sulfide reactants and their method of preparation is the following:

In each of the following Examples A, B, C, D, E, F, G and H the reaction vessel is a resin flask equipped with an agitator, thermometer, water-cooled reflux condenser or, and preferably for more economic use of hydrogen sulfide a dry ice-cooled reflux condenser, and a gas inlet tube. The gas inlet tube is connected in turn to a trap and flowmeter and thence to a hydrogen sulfide source. The outlet of the reflux condenser is connected to a safety trap and thence to a hydrogen halide scrubber. The issuing gas from the scrubber is lead to the flame of a gas burner and the unreacted hydrogen sulfide burned.

Example A.—Methylthionophosphine sulfide

To the aforedescribed reaction vessel is charged approximately 972 grams of metylthionophosphonic dichloride,

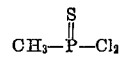

and the charge heated to the reflux temperature (about 160°C.). Hydrogen sulfide is then passed beneath the surface of the dichloride at varying rates in the range of 12 to 30 grams per hour until approximately 407 grams of hydrogen sulfide is added. During this addition the reaction temperature is maintained in the range of about 160 to 215°C. The reaction mass is cooled to room temperature, broken out of the reaction vessel, triturated under pentane, and dried in a vacuum dessicator. The yield of solid product is 98.6% of theory based on the dichloride charged.

Analysis.—Theory 28.2% P, 58.4% S. Found 27.5% P, 58.4% S.

The molecular weight of the solid product (an average of three ebullioscopic molecular weight determinations in carbon tetrachloride) is 226. Since 220 is the theoretical molecular weight of

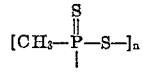

wherein $n$ is 2, the results indicate that the solid product is or is predominantly the dimeric compound (i.e., $n=2$).

Example B.—Ethylthionophosphine sulfide

To the aforedescribed reaction vessel is charged approximately 100 grams of ethylthionophosphonic dichloride,

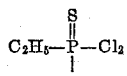

and the charge heated to approximately 175°C. Approximately 101 grams of hydrogen sulfide is then slowly passed beneath the surface of the dichloride over a period of about 11 hours. During this addition period the reaction temperature is maintained in the range of about 165 to about 220°C. The reaction mass is then cooled to room temperature, broken out of the reaction vessel, triturated under pentane, filtered and dried in a vacuum dessicator. The solid product (74.2 grams; 97.5% of theory yield based on dichloride charged) so obtained melts at 142–147°C. The molecular weight of the solid product (an average of three ebullioscopic molecular weight determinations in carbon tetrachloride over a wide range of concentrations to permit extrapolation to zero concentration) is 249. Theoretically the molecular weight of

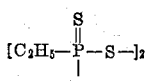

is 248 which indicates the solid product is or is predominantly the dimeric compound. Upon recrystallizing the solid product from chlorobenzene the melting point is 146–148°C.

*Analysis.*—Theory, 25.0% P. Found, 24.2% P.

Example C.—Isopropylthionophosphine sulfide

To the aforedescribed reaction vessel is charged approximately 149 grams of isopropylthionophosphonic dichloride

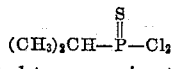

and the charge heated to approximately 170°C. Approximately 96 grams of hydrogen sulfide is passed beneath the surface of the dichloride at a rate of approximately 0.2 gram per minute. During this addition period the reaction temperature is maintained in the range of from about 170°C. to about 210°C. The reaction mass is then cooled to room temperature, broken out of the reaction vessel, washed with hexane and dried in a vacuum dessicator. The solid product (106 grams; 91.5% of theory yield based on dichloride charged) so obtained melts in the range of 160–175°C. The molecular weight of the solid product (an average of three ebullioscopic molecular weight determinations in carbon tetrachloride) is 298 which indicates it is composed largely of the dimeric compound, i.e.

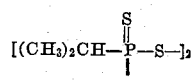

the residual components being higher polymeric forms of the dimeric compound. Upon recrystallizing the reaction product from chlorobenzene the melting point is 180–181.5°C.

*Analysis.*—Theory 22.4% P, 46.4% S. Found 21.8% P, 46.5% S.

Example D.—n-Butylthionophosphine sulfide

To the aforementioned reaction vessel is charged approximately 250 grams of n-butylthionophosphonic dichloride

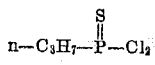

and the charge heated to approximately 170°C. Approximately 230 grams of hydrogen sulfide is then passed beneath the surface of the dichloride at a rate of approximately 0.2 gram per minute. During this addition the reaction temperature is maintained in the range of from about 170°C. The reaction mass is then cooled to room temperature, broken out of the reaction vessel, washed with hexane and dried in a vacuum dessicator. The yield is 181 grams (91% of theory based on the dichloride charged). The molecular weight of the solid product (an average of three ebullioscopic molecular weight determinations in carbon tetrachloride) is 314 which indicates the product is or predominantly is the dimeric compound

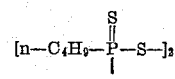

Upon recrystallizing the solid product from chlorobenzene gives a melting point of 105–110°C.

*Analysis.*—Theory 20.4% P. Found 20.2% P.

Example E.—n-Propylthionophosphine sulfide

To the aforedescribed reaction vessel is charged approximately 87 grams of n-propylthionophosphonic dichloride

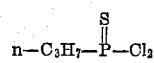

and the charge heated to approximately 170°C. Approximately 250 grams of hydrogen sulfide is then passed beneath the surface of the dichloride at a rate of about 0.2 gram per minute. During this addition the reaction temperature is maintained in the range of from about 170°C. to about 210°C. The reaction mass is then cooled to room temperature, broken out of the reaction vessel, washed with hexane and then dried in a vacuum dessicator. The solid product (68 grams; 79.5% of theory yield based on dichloride charged) so obtained melts in the range of 86–96°C. The molecular weight of the solid product (an average of three ebullioscopic molecular weight determinations in carbon tetrachloride) is 301 which indicates the product is largely the dimeric compound

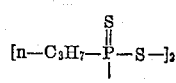

the residual components being higher polymeric forms thereof. Upon recrystallizing the solid product from chlorobenzene the melting point is 97–99°C.

*Analysis.*—Theory 22.5% P. Found 21.9% P.

Example F.—Phenylthionophosphine sulfide

To the aforedescribed reaction vessel is charged approximately 100 grams of phenylthionophosphonic dichloride

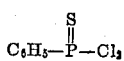

and the charge heated to approximately 235°C. Hydrogen sulfide is then passen beneath the surface of the dichloride at a rate of about 0.33 gram per minute until hydrogen chloride stops evolving. During this addition the reaction temperature is maintained in the range of from about 175 to about 235°C. The reaction mass is then cooled to room temperature and broken out of the reaction vessel, washed with hexane, and dried in a vacuum dessicator to give 70 grams of product which melts in the range of 215–232°C. The molecular weight of the solid product (an average of three ebullioscopic molecular weight determinations in carbon tetrachloride) is 342 which indicates the solid product is or is predominantly the dimeric compound

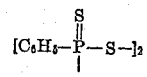

Upon recrystallizing the solid product from chlorobenzene the melting point is 233–243°C.

*Analysis.*—Theory 18.0% P, 37.2% S. Found 17.4% P, 36.62% S.

Example G.—Cyclohexylthionophosphine sulfide

To the aforedescribed reaction vessel is charged approximately 49.8 grams of cyclohexylthionophosphonic dichloride

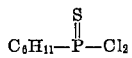

and the charge heated to approximately 200°C. Approximately 200 grams of hydrogen sulfide is then passed beneath the surface of the dichloride at a rate of about 0.2 gram per minute. During this addition the reaction temperature is maintained in the range of from 200 to 215°C. The reaction mass is then cooled to room temperature, broken out of the reaction vessel, triturated under hexane, and dried in a vacuum dessicator. The solid product (86% of theory yield based on dichloride charged) so obtained melts in the range of 138–155°C. The molecular weight of the solid product (an average of three ebullioscopic molecular weight determinations in carbon tetrachloride) is 419 which indicates that the solid product is a mixture of cyclohexylthionophosphine sulfides of the formula

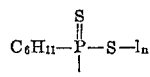

in which mixture the dimeric compound (i.e., n=2) predominates, the other component parts being higher polymeric forms thereof. Upon recrystallizing the solid product from chlorobenzene the melting point is 189–192°C.

*Analysis.*—Theory 17.5% P, 36.6% S. Found 17.2% P, 36.8% S.

In the preparation of several of the hydrocarbylthionophosphine sulfide reactants for the method of this invention it was found advantageous to include in the initial charge a small amount (e.g. up to about 15% by weight of the dihalide reactant charged) of the desired end product to hasten initial reaction and illustrative of such is the following:

Example H.—Methylthionophosphine sulfide

To the aforedescribed reaction vessel is charged approximately 972 grams of methyl thiophosphine dichloride

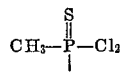

and approximately 100 grams of previously prepared methyl dithiophosphonic acid anhydride

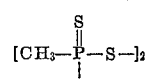

and the charge heated to 153°C. Hydrogen sulfide is then passed beneath the surface of the mass at a rate of about 0.2 gram per minute until hydrogen chloride stops evolving while maintaining the reaction mass at a temperature in the range of about 160 to 215°C. The reaction mass is then cooled to room temperature, broken out of the reaction vessel, triturated under pentane, and dried in a vacuum dessicator. The solid product (794 grams) melts in the range of 200–208°C. The molecular weight of the solid product (an average of three ebullioscopic molecular weight in carbon tetrachloride) is 235 which indicates the solid product is a mixture of materials satisfying the formula

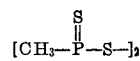

wherein *n* averages approximately 2.15 and is composed chiefly of the dimeric compound

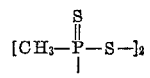

the residual components being higher polymeric forms thereof. The solid product after recrystallizing from chlorobenzene gives a melting point of 206–211°C. and analyzes as follows: Theory 28.2% P, 58.4% S. Found 27.9% P, 58.4% S.

In a similar manner employing the appropriate hydrocarbylthionophosphonic dichloride other hydrocarbylthionophosphine sulfides are prepared, e.g.

2-ethylhexylthionophosphine sulfide,
laurylthionophosphine sulfide,
n-octadecylthionophosphine sulfide,
cyclopentylthionophosphine sulfide,
p-tolylthionophosphine sulfiide,
n-dodecylphenylthionophosphine sulfide,
benzylthionophosphine sulfide,
p-biphenylylthionophosphine sulfide,
2-naphthylthionophosphine sulfide, and the like, which are operable in preparing the aforedescribed arylphosphinodithioic acids.

The aromatic compound reactant R′H of the method of this invention is characterized by having at least one resonant carbocyclic aromatic ring structure and having at least one nuclear hydrogen atom attached to said resonant structure and also as being free of aliphatic unsaturation (i.e., containing neither olefinic or acetylenic substituents). These reactants include the aromatic hydrocarbons such as benzene, toluene, the various xylene, mesitylene, durene, ethylbenzene, the various di- and triethylbenzenes, n-propylbenzene, cumene, n-butylbenzene, t-butylbenzene, isooctylbenzene, laurylbenzene, cyclopentylbenzene, cyclohexylbenzene, diphenylmethane, benzylcyclohexane, diphenyl, the various phenyltoluenes, the various ditolyls, the various diphenyl-phenylenes, indene, the various mono- and dimethylindenes, the various monophenyl-indenes, naphthalene, α- and β-methylnaphthalenes, the various dimethylnaphthalenes, α- and β-ethylnaphthalenes, α- and β-phenylnaphthalenes, fluorene, anthracene, phenanthrene, chrysene, etc., containing up to 18 carbon atoms. Other operable reactants are the said aromatic hydrocarbons having substituents on the aromatic nucleus thereof such as the halogens chlorine and bromine, and radicals of the formula AX—wherein X is a chalkogen of atomic weight less than 40 (i.e. sulfur or oxygen) and wherein A is a hydrocarbyl radical free of aliphatic unsaturation and containing from 1 to 12 carbon atoms (e.g. the various alkyl, aryl, alkaryl, aralkyl, cycloalkyl, etc., exemplary of which are methyl, ethyl, propyl, butyl, amyl, hexyl, octyl, decyl, dodecyl, phenyl, biphenyl, tolyl, xylyl, mesityl, ethylphenyl, butylphenyl, hexylphenyl, cyclohexylphenyl, benzyl, phenethyl, phenhexyl, cyclopentyl, cyclohexyl, cycloheptyl, methylcyclohexyl, naphthyl, methylnaphthyl, indenyl, etc.), and the various isomeric forms thereof). As illustrative of these substituted aromatic hydrocarbons are chlorobenzene, bromobenzene, the various dihalobenzenes such as 1,4-dichlorobenzene, 1,4-dibromobenzene, 1-chloro-4-bromobenzene, the various trihalobenzenes such as 1,2,4-trichloro- and 1,2,4-tribromobenzene, the various halotoluenes such as 1,2-chlorotoluene and 1,4-bromotoluene, 1,2,4-bromo-o-xylene, 1,3,4-chloro-m-xylene, 2- and 4-chlorodiphenyl, 2- and 4-bromodiphenyl, 4,4′-dichlorodiphenyl, 2-chloronaphthalene, 1,2-dichloronaphthalene, etc., anisole, phenetole, n-butoxybenzene, lauroxybenzene, diphenyl ether, benzyloxybenzene, 1,2-dimethoxybenzene, 1,2-diethoxybenzene, cyclohexyloxybenzene, the various phenoxydiphenyls, 4-methoxytoluene, 1-phenoxynaphthalene, methylmercaptobenzene, ethylmercaptobenzene, laurylmercaptobenzene, diphenylsulfide, 1,3-(dimethylmercapto)benzene, etc. A particularly useful group of these reactants are the aromatic hydrocarbons, e.g. those of the benzene series (sometimes termed benzenoid hydrocarbons) such as benzene, toluene, xylene, isopropylbenzene, t-butylbenzene, and various isomeric forms thereof containing up to 10 carbon atoms. Another useful group of these reactants are the chlorobenzenes of the empirical formula $C_6H_{6-m}Cl_m$ wherein $m$ is a whole number from 1 to 4, e.g. chlorobenzene, 1,2-dichlorobenzene, 1,3,4-trichlorobenzene, 1,2,4,5-tetrachlorobenzene, and the various isomeric forms thereof. In those instances wherein purity of the arylphosphinodithioic acid is of no great importance mixtures of these reactants can be employed.

The aluminum halide catalysts include aluminum chloride and aluminum bromide, although aluminum chloride is preferred.

While the reaction of the method of this invention proceeds as follows

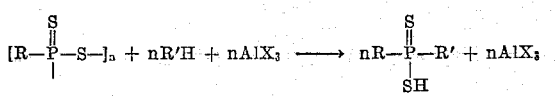

wherein R, R' and $n$ have the aforedescribed significance and wherein X is chlorine or bromine, amounts of aluminum halide in excess of $n$ moles per mole of hydrocarbylthionophosphine sulfide can be used, for example up to $4n$ moles, however in general approximately $2n$ moles of aluminum halide per mole of hydrocarbylthionophosphine sulfide will provide optimum results.

The aromatic compound R'H employed in the method of this invention will be employed in a molar ratio of at least $n$ moles per mole of hydrocarbylthionophosphine sulfide reactant. However to facilitate agitation in commercial operations a substantial excess of the aromatic compound R'H can be employed, e.g. up to $25n$ moles per mole of hydrocarbylthionophosphine sulfide reactant. In those instances where it is not convenient to employ an excess of the aromatic compound reactant substantially equivalent agitation can be realized employing an inert solvent.

In general the method of this invention will be conducted at a temperature in the range of from about 50°C. to about 300°C. Pressures above or below atmospheric pressure can be employed but in general atmospheric pressure will be satisfactory. The time of heating will vary widely depending upon the reactants involved, the reaction temperature and the designs of the chemical operator.

As illustrative of the method of this invention is the following:

Example I

To a suitable reaction vessel equipped with a thermometer, agitator and reflux condenser is charged 234 parts by weight (approximately 3.0 moles) of benzene and 51.6 parts by weight (approximately 0.3 mole) of phenylthionophosphine sulfide (the product of Example F). While agitating the so charged mass is heated to about 50° C. While continuing the agitation 80 parts by weight (approximately 0.6 mole) of aluminum chloride is added in portions of 10 parts by weight while maintaining the temperature at 60–65° C. Upon completion of the aluminum chloride addition the mass is refluxed (about 80° C.) for eight hours. The refluxed mass is permitted to cool and poured into a crushed ice —5% hydrochloric acid mixture. The layers are separated, the aqueous layer is extracted with benzene and combined with the original layer, which latter mix is evaporated under diminished pressure to give 66.7 parts by weight of greenish yellow liquid. This liquid on recrystallizing from isopropanol gives diphenylphosphinodithioic acid, M.P. 54–55° C.

Example II

Employing the procedure of Example I but replacing phenylthionophosphine sulfide with an equimolecular amount of methylthionophosphine sulfide (the product of Example H) there is obtained in a 75% by weight yield based on the sulfide charged of methylphenylphosphinodithioic, a greenish liquid, $n_D^{22}$ 1.6787.

Example III

Employing the procedure of Example I but replacing phenylthionophosphine sulfide with an equimolecular amount of ethylthionophosphine sulfide (the product of Example B) there is obtained in a 79% by weight yield based on the sulfide charged of ethylphenylphosphinodithioic acid, M.P. 64.5° C. after recrystallization from ethanol.

Example IV

Employing the procedure of Example I but replacing phenylthionophosphine sulfide with an equimolecular amount of isopropylthionophosphine sulfide (the product of Example C) there is obtained in an 81% by weight yield based on the sulfide charged of isopropylphenylphosphinodithioic acid, a greenish fluid, $n_D^{22}$ 1.6354.

Example V

Employing the procedure of Example I but replacing phenylthionophosphine sulfide with an equimolecular amount of n-butylthionophosphine sulfide (the product of Example D) and employing a 4 hour refluxing period instead of the 8 hour refluxing period there is obtained in a 92% by weight yield based on the sulfide charged of n-butylphenylphosphinodithioic acid, a greenish liquid, $n_D^{22}$ 1.6222.

Example VI

Employing the procedure of Example I but employing 160 parts by weight (approximately 1.2 moles) of aluminum chloride a yield of 89% by weight of diphenylphosphinodithioic acid based on the sulfide charged is obtained.

Example VII

Employing the procedure of Example I but employing 40 parts by weight of aluminum chloride (approximately 0.3 mole) a yield of about 75% of weight of diphenylphosphinodithioic acid based on the sulfide charged is obtained.

Example VIII

Employing the procedure of Example I but employing 1,4-dichlorobenzene instead of benzene there is obtained phenyl(2,5-dichlorophenyl)phosphinodithioic acid.

Example IX

Employing the procedure of Example I but employing 1,4-xylene instead of benzene there is obtained phenyl(2,5-dimethylphenyl)phosphinodithioic acid.

While this invention has been described with respect to certain embodiments it is to be understood that variations and modifications thereof obvious to those skilled in the art can be made, e.g. mode of mixing the reagents and recovery of the reaction product, without departing from the spirit or scope of this invention.

The embodiments of the invention, in which an exclusive property or privilege is claimed, are defined as follows:

1. The method of making an arylphosphinodithioic acid of the formula

wherein R is a hydrocarbyl radical free of aliphatic unsaturation and having from 1 to 18 carbon atoms and wherein R' is an aromatic radical having a resonant carbocyclic aromatic ring structure directly attached to the phosphorus atom which comprises reacting in the presence of an aluminum halide catalyst selected from the group consisting of aluminum chloride and aluminum bromide a hydrocarbylthionophosphine sulfide of the formula

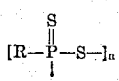

wherein R has the aforedescribed significance and wherein n is a whole number with an aromatic compound of the formula R'H wherein R' has the aforedescribed significance, said aromatic compound being free of aliphatic unsaturation, the reaction temperature being in the range of from about 50° C. to about 300° C., the ratio of reactants being at least n moles of R'H wherein n and R' have the aforedescribed significances per mole of said hydrocarbylthionophosphine sulfide, the ratio of said aluminum halide catalyst to said hydrocarbylthionophosphine sulfide being from n up to 4n moles of the former per mole of the former per mole of the latter wherein n has the aforedescribed significance.

2. The method of making an arylphosphinodithioic acid of claim 1 wherein R' is an aromatic hydrocarbon radical having from 6 to 18 carbon atoms, wherein the aluminum halide catalyst is aluminum chloride, and wherein n is a whole number less than 5.

3. The method of making an arylphosphinodithioic acid of claim 2 wherein R is phenyl, and wherein n is 2.

4. The method of making an arylphosphinodithioic acid of claim 3 wherein R' is phenyl, wherein R'H is benzene, and wherein the amount of aluminum chloride catalyst is approximately 4 moles.

5. The method of making an arylphosphinodithioic acid of the formula

wherein R is an alkyl radical having from 1 to 4 carbon atoms the alpha-carbon atom of which has at least one hydrogen substituent and wherein R' is an aromatic hydrocarbon radical having from 6 to 18 carbon atoms and having a resonant carbocyclic aromatic ring structure directly attached to the phosphorus atom which comprises reacting in the presence of aluminum chloride a hydrocarbylthiononophosphine sulfide of the formula

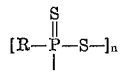

wherein R has the aforedescribed significance and wherein n is 2 with an aromatic compound of the formula R'H wherein R' has the aforedescribed significance, said aromatic compound being free of aliphatic unsaturation, the reaction temperature being in the range of from about 50° C. to about 300° C., the ratio of reactants being at least n moles of R'H wherein n and R' have the aforedescribed significances per mole of said hydrocarbylthionophosphine sulfide, the ratio of said aluminum chloride to said hydrocarbylthionophosphine sulfide being from n up to 4n moles of the former per mole of the latter wherein n has the aforedescribed significance.

6. The method of making a phenylphosphinodithioic acid of the formula

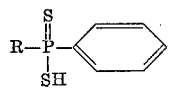

wherein R is an alkyl radical having from 1 to 4 carbon atoms the alpha-carbon atom of which has at least one hydrogen substitute which comprises reacting in the presence of aluminum chloride a hydrocarbylthionophosphine sulfide of the formula

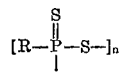

wherein R has the aforedescribed significance and wherein n is 2 with benzene, the reaction temperature being in the range of from about 50° C. to about 300° C., the ratio of reactants being at least n moles of benzene wherein n has the aforedescribed significances per mole of said hydrocarbylthionophosphine sulfide, the ratio of said aluminum chloride to said hydrocarbylthionophosphine sulfide being from n up to 4n moles of the former per mole of the latter wherein n has the aforedescribed significance.

7. The method of making a phenylphosphinodithioic acid of the formula

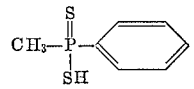

which comprises reacting in the presence of aluminum chloride a methylthionophosphine sulfide of the formula

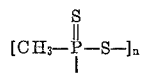

wherein n is 2 with benzene, the reaction temperature being in the range of from about 50° C. to about 300° C., the ratio of reactants being at least n moles of benzene wherein n has the aforedescribed significances per mole of said methylthionophosphine sulfide, the ratio of said aluminum chloride to said methylthionophosphine sulfide being approximately 2n moles of the former per mole of the latter wherein n has the aforedescribed significance.

8. The method of making a phenylphosphinodithioic acid of the formula

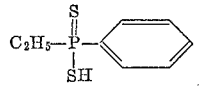

which comprises reacting in the presence of aluminum chloride an ethylthionophosphine sulfide of the formula

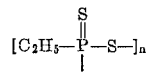

wherein n is 2 with benzene, the reaction temperature being in the range of from about 50° C. to about 300° C., the ratio of reactants being at least n moles of benzene wherein n has the aforedescribed significance per mole of said ethylthionophosphine sulfide, the ratio of said aluminum chloride to said ethylthionophosphine sulfide being approximately 2n moles of the former per mole of the latter wherein n has the aforedescribed significance.

References Cited

UNITED STATES PATENTS 2,797,238   6/1957   Miller et al. _____ 260—500
2,847,458   8/1958   Chao et al. _____ 260—500

FOREIGN PATENTS 1,124,946   3/1962   Germany.

BERNARD HEFLIN, *Acting Primary Examiner.*

LEON ZITVER, *Examiner.*

K. H. JOHNSON, J. E. EVANS, *Assistant Examiners.*